United States Patent
Edlis et al.

(10) Patent No.: US 7,301,987 B2
(45) Date of Patent: Nov. 27, 2007

(54) BACKGROUND PROCESSING AND SEARCHING FOR A COMMUNICATION CHANNEL

(75) Inventors: Ofir Edlis, Modiin (IL); Roni Shoev, Rishon LeZion (IL)

(73) Assignee: Intel Corporation, Santa Clara ( * ) Notice: Subject to any disclaimer, the term of this patent is extended or adjusted under 35 U.S.C. 154(b) by 807 days.

(21) Appl. No.: 09/778,818

(22) Filed: Feb. 8, 2001

(65) Prior Publication Data

US 2002/0126737 A1 Sep. 12, 2002

(51) Int. Cl.
*H04B 1/69* (2006.01)
*H04B 17/07* (2006.01)

(52) U.S. Cl. ............... 375/140; 375/138; 375/139; 375/132

(58) Field of Classification Search ........... 375/130, 375/144, 147, 146, 148, 149, 150, 152, 140, 375/141, 142, 138, 136, 139, 335, 367; 455/67.1, 455/517; 370/311; 713/322, 601
See application file for complete search history.

(56) References Cited

U.S. PATENT DOCUMENTS

| | | | |
|---|---|---|---|
| 3,806,663 A * | 4/1974 | Peek et al. ............... 455/572 |
| 4,839,639 A | 6/1989 | Sato et al. | |
| 5,152,006 A | 9/1992 | Klaus | |
| 5,252,963 A | 10/1993 | Snowden et al. | |
| 5,265,270 A | 11/1993 | Stengel et al. | |
| 5,361,276 A | 11/1994 | Subramanian | |
| 5,392,287 A * | 2/1995 | Tiedemann et al. ......... 370/311 |
| 5,448,774 A | 9/1995 | Yokozaki et al. | |
| 5,471,655 A | 11/1995 | Kivari | |
| 5,551,078 A | 8/1996 | Connell et al. | |
| 5,627,882 A | 5/1997 | Chien et al. | |
| 5,677,928 A * | 10/1997 | Rizzo et al. .............. 375/134 |
| 5,678,227 A | 10/1997 | Connell et al. | |
| 5,708,971 A | 1/1998 | Dent | |
| 5,737,322 A | 4/1998 | Burbidge et al. | |
| 5,740,517 A | 4/1998 | Aoshima | |
| 5,754,583 A | 5/1998 | Eberhardt et al. | |
| 5,758,266 A | 5/1998 | Kornfeld et al. | |
| 5,822,689 A | 10/1998 | Hwang | |
| 5,896,561 A * | 4/1999 | Schrader et al. ......... 455/67.11 |
| 5,936,950 A | 8/1999 | Hottinen | |
| 5,940,771 A * | 8/1999 | Gollnick et al. ............ 455/517 |

(Continued)

FOREIGN PATENT DOCUMENTS

WO    WO 98/44670    10/1998

OTHER PUBLICATIONS

U.S. Appl. No. 09/371,276, filed Aug. 10, 1999, Rainish et al.

(Continued)

*Primary Examiner*—Mohammed Ghayour
*Assistant Examiner*—Qutub Ghulamali
(74) *Attorney, Agent, or Firm*—Pearl Cohen Zedek Latzer LLC (57) ABSTRACT

A method including searching for a communication channel by activating a receiver having a radio frequency (RF) module and a baseband module for storing a portion of received signals within a first time period, de-activating the RF module of the receiver, and background processing the portion of the received signals with a variable clock rate within a second time period.

16 Claims, 5 Drawing Sheets

U.S. PATENT DOCUMENTS

| | | | |
|---|---|---|---|
| 5,950,131 A | 9/1999 | Vilmur | |
| 5,960,039 A * | 9/1999 | Martin et al. | 375/267 |
| 6,088,576 A | 7/2000 | Sone | |
| 6,091,703 A * | 7/2000 | Saunders et al. | 370/210 |
| 6,108,324 A | 8/2000 | Brown et al. | |
| 6,115,388 A | 9/2000 | Chinitz et al. | |
| 6,125,137 A | 9/2000 | Wang et al. | |
| 6,134,440 A | 10/2000 | Black | |
| 6,173,409 B1 * | 1/2001 | Watts et al. | 713/322 |
| 6,208,837 B1 | 3/2001 | Koh et al. | |
| 6,223,047 B1 | 4/2001 | Ericsson | |
| 6,263,448 B1 * | 7/2001 | Tsern et al. | 713/501 |
| 6,269,043 B1 * | 7/2001 | Batcher | 365/227 |
| 6,289,228 B1 | 9/2001 | Rotstein et al. | |
| 6,453,181 B1 * | 9/2002 | Challa et al. | 455/574 |
| 6,584,313 B2 * | 6/2003 | Butler et al. | 455/434 |
| 6,606,490 B1 | 8/2003 | Rainish et al. | |
| 6,608,858 B1 * | 8/2003 | Sih et al. | 375/147 |
| 6,728,300 B1 * | 4/2004 | Sarkar et al. | 375/147 |
| 6,804,503 B2 * | 10/2004 | Shohara et al. | 455/343.4 |
| 2001/0053174 A1 * | 12/2001 | Fleming et al. | 375/130 |
| 2001/0053714 A1 * | 12/2001 | Sako | 463/17 |
| 2003/0076816 A1 * | 4/2003 | Naranjo et al. | 370/352 |
| 2003/0189947 A1 * | 10/2003 | Beshai | 370/428 |

OTHER PUBLICATIONS

U.S. Appl. No. 09/780,470, filed Feb. 12, 2001, Edlis et al.
U.S. Appl. No. 10/197,212, filed Jul. 18, 2002, Rainish et al.
David M. DiCarlo and Charles L. Weber, "Multiple Dwell Serial Search: Performance and Application to Direct Sequence Code Acquisition", IEEE Transaction on Communications, vol. COM-31, pp. 650-659, No. 5, May 1983.

* cited by examiner

BACKGROUND PROCESSING AND SEARCHING FOR A COMMUNICATION CHANNEL

FIELD OF THE INVENTION

The present invention relates to a receiver and a method of searching a communication channel, in general, and particularly to a receiver and a method of searching a cellular communication channel.

BACKGROUND OF THE INVENTION

In cellular communications systems, such as Code Division Multiple Access (CDMA) cellular communications systems, the base stations of the cells may use the same radio frequency for an up-link communication. Each base station broadcasts a pilot channel or signal, a synchronization channel, a paging channel and a traffic channel. The pilot signal may comprise a pseudo-random noise (PN) code signal. The pilot signal is commonly received by all mobile stations within the cell range and is used by the mobile station for identifying the presence of a cellular communication system, which may be a CDMA system. The pilot signal transmitted by each base station in the system uses the same PN code but with a different phase offset. The base stations are identified by using a unique starting phase or starting time for the PN sequences.

At the mobile station, the process of acquisition includes receiving RF signals, which includes receiving pilot, synchronization, paging, and traffic channels from all nearby base stations. The mobile station must identify all the pilot signals that are receivable and generally selects the base station with the strongest pilot channel. The online channel acquisition is a battery-power consuming operation. Thus valuable savings in battery power may be realized if the power consumption may be reduced.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take tie form of electrical Or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated wilt the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general purpose computer selectively activated or reconfirmed by a computer program stored in the computer. Such a computer program may be stored in a computer readable storage medium, such as, but is not limited to, any type of disk including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EFPROMs), magnetic or optical cards, or any other type of media suitable for storing electronic instructions, and capable of being coupled to a computer system bus.

The present invention is described with particular reference to one of the communications systems being CDMA. However, it is appreciated that the invention is not limited to CDMA, and encompasses any kind of spread spectrum communication, as well as other kinds of wireless communications, such as wide-band CDMA or Global Mobile Systems (GSM), suitable for the offline technique described herein.

Figure 1:
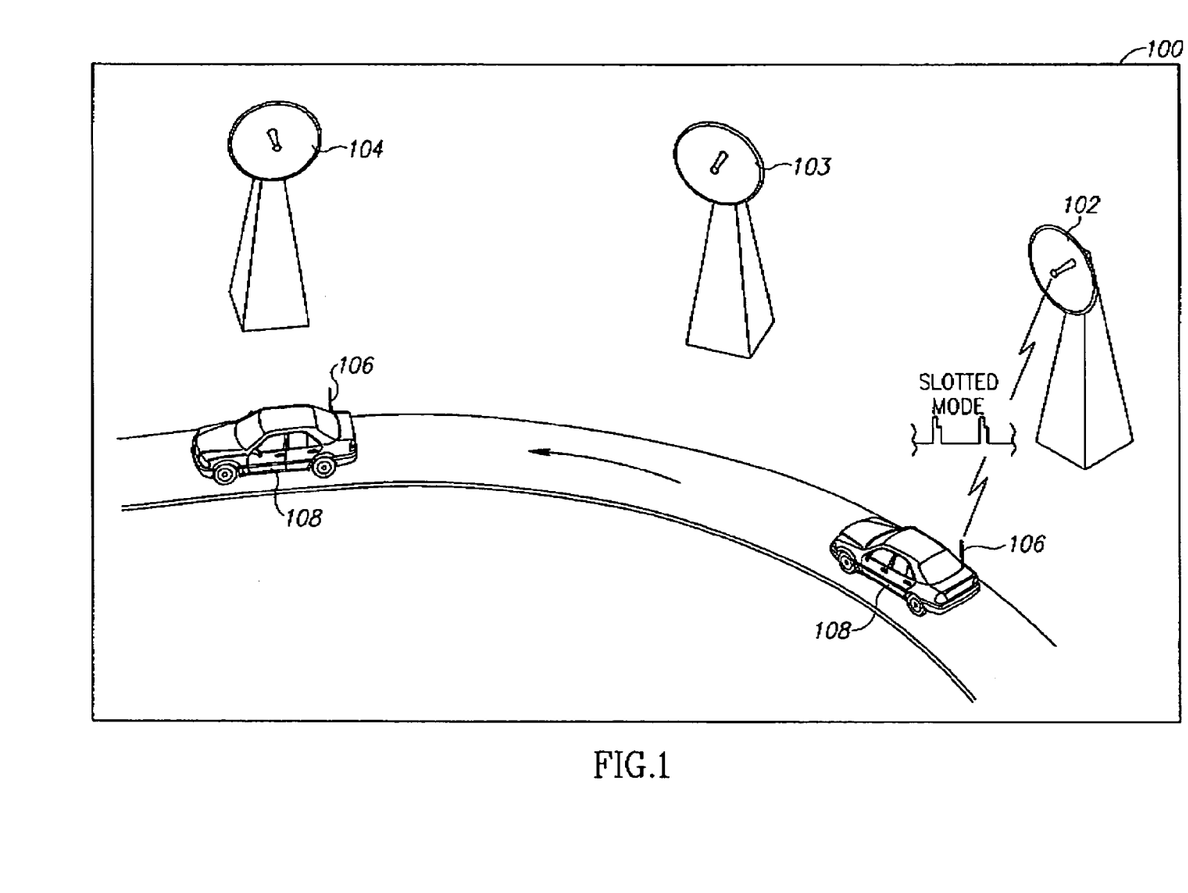
FIG. 1 is a pictorial illustration of a cellular communications system that employs a CDMA receive path of the present invention.

Reference is now made to FIG. 1, which illustrates a cellular communications system 100 that employs down-link and up-link communication channels in accordance with the present invention.

Cellular communications system 100 includes a plurality of base stations, such as base stations 102, 103 and 104, which are cells in the communications system. The base stations may communicate with any one of mobile stations, such as mobile station 106 in a moving vehicle 108. Each base station may broadcast a pilot signal, a synchronization channel, a paging channel and a traffic channel. The pilot signal may comprise a pseudo random noise (PN) code signal. The pilot signal may be commonly received by all mobile stations within range and may be used by the mobile station for identifying the presence of cellular communication system 100. The pilot signal transmitted by each base station in the system may use the same PN code but with a different phase offset. The base stations may be identified by using a unique starting phase or stating time for the PN sequences.

Mobile station 106 may initially acquire the signals from the base stations in the receiving range of mobile station 106, which may be base stations 102 and 103, for example. Acquisition may comprise receiving pilot, synchronization, paging, and traffic channels from the nearby base stations 102 and 103. Communication from mobile station 106 to any of the base stations may be performed by up-link communication channels. Conversely, communication from any of the base stations to mobile station 106 may be performed by down-link communication channels.

After initial system acquisition, mobile station 106 may wait for further pages from the base stations 102, 103 and 104 and may be in standby mode. When vehicle 108 is closest to base station 102, base station 102 may be considered the current cell, and base stations 103 and 104 may be considered neighboring cells. Base station 103 may also be considered a possible candidate cell for communication with mobile station 106, that is, it may have a good probability of becoming the current cell. This is because as vehicle 108 travels further away from base station 102 towards base station 103, the receiving range of mobile station 106 may be better suited for receiving from base station 103 than from base station 102. Accordingly, the status of the cells as regards communication with mobile station 106 must be updated constantly to ensure that mobile station 106 always communicates with the cell in the best receiving range.

Updating the status of the cells may be performed during standby mode, wherein mobile station 106 waits for further pages from the base stations 102, 103 and 104. This may be accomplished by slotted mode, described herein below with reference to FIGS. 4 and 5.

Standard CDMA receiver systems, such as used by mobile station 106, may comprise receivers that receive radio frequency (RF) and CDMA signals, as well as analog and digital circuitry used to process the signals. In one embodiment of the invention, the CDMA signal is recorded. For this embodiment, only those portions of the analog and digital circuitry necessary for recording the CDMA signal are energized. During the processing of the recorded data, the RF and analog path (analog-to-digital converters and filters, for example), and any portion of the receiver system not utilized for processing the recorded data may be either turned off or switched to any other mode (for example, analog), hence reducing power consumption Reference is now made to FIG. 2, which illustrates a CDMA receive path, in accordance with an embodiment of the invention. The CDMA receive path may include a down converter 10, also called a baseband module, that may receive RF from an RF antenna 5. Down converter 10 may output an intermediate frequency (IF) signal to a saw filter 20, which may be connected to an in-phase/quadrature (I/Q) down converter 30. The output of I/Q down converter 30 may be sent to an analog processing unit 40, which in turn may output to a digital processing unit 60 via an analog-to-digital converter (ADC) 50. Digital processing unit 60 may output in-phase (I) signals and quadrature (Q) signals to a rake receiver and search engine 70. In one embodiment of the invention, analog processing unit 40 may comprise, without limitation, analog filtering, a DC remover, and automatic gain control (AGC) or any other suitable analog processing circuitry (not shown). Digital processing unit 60 may comprise, without limitation, digital filtering, interpolating, or any other suitable digital processing circuitry (not shown), and may be a digital signal processor. The elements of the CDMA receive path, excluding down converter 10, are also referred to collectively or singly as radio frequency (RF) modules. The analog processing unit 40, digital processing unit 60 and rake receiver and search engine 70 are also referred to collectively or singly as a processor. The processor uses processing techniques well known in the art to identify the pilot signals that are receivable including the pilot signal from the base station with the strongest pilot channel.

Figure 2:
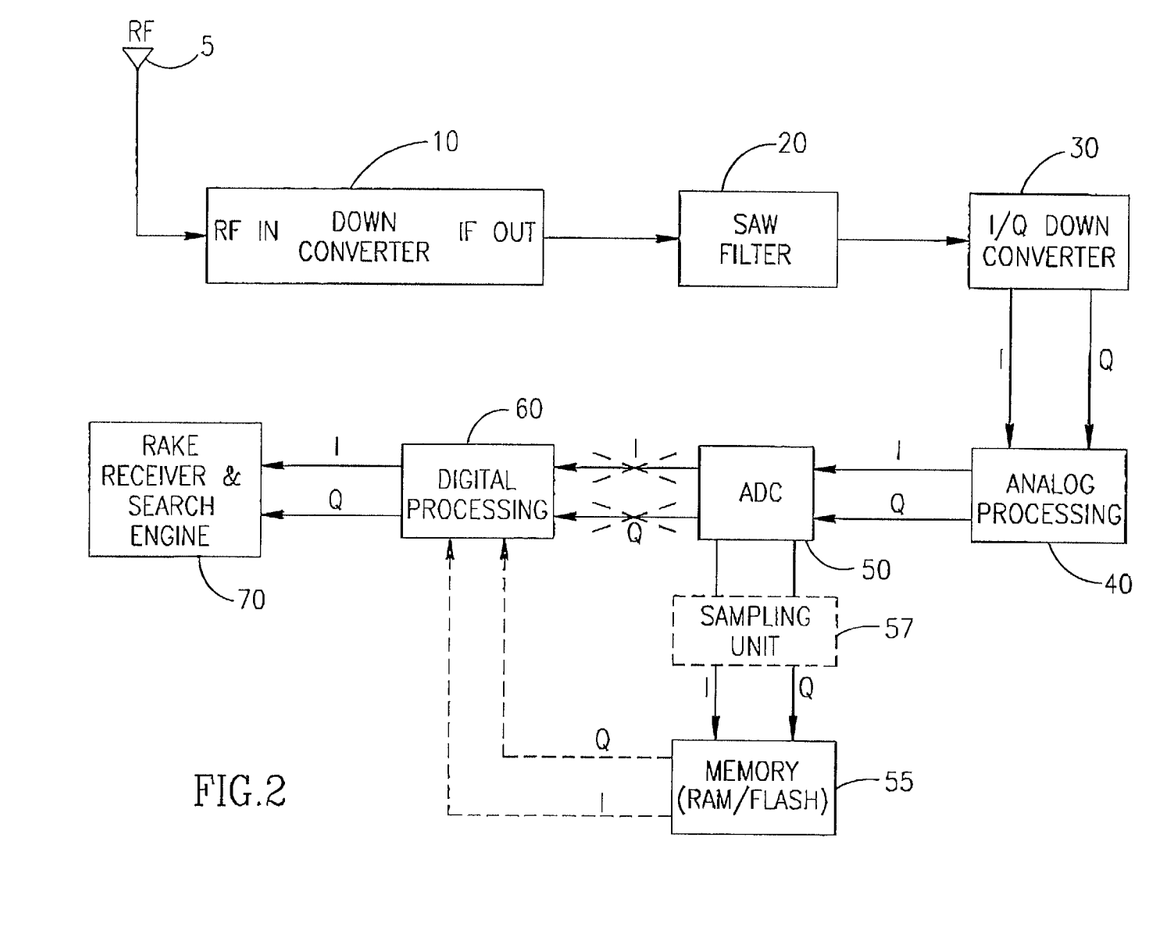
FIG. 2 is a schematic illustration of a CDMA receive path, with an indication of a point for recording a portion of a CDMA signal, according to an embodiment of the present invention.

In the illustrated embodiment, the portion of the signal may be recorded between the output of ADC 50 and the input to digital processing unit 60. The portion of the recorded signal may be stored in a memory device, called memory 55, such as, but not limited to, a read-access memory (RAM) or flash memory. In this embodiment of the invention, the power consumption may be reduced by turning off both digital processing unit 60 and rake receiver and search engine 70 while recording the portion of de CDMA signal.

The sampling rate used for the searching may be variable. If searching is accomplished with a lower sampling rate than the sampling rate provided by ADC 50, then the ADC clock frequency (also called clock rate) may be reduced, thus reducing power consumption Alternatively, a sampling unit 57 may be implemented between ADC 50 and memory 55, adapted to truncate the data rate to the required rate. Using at least one of the alternatives (clock frequency reduction or sampling unit 57) may enable a reduction in the size of memory 55.

Figure 3:
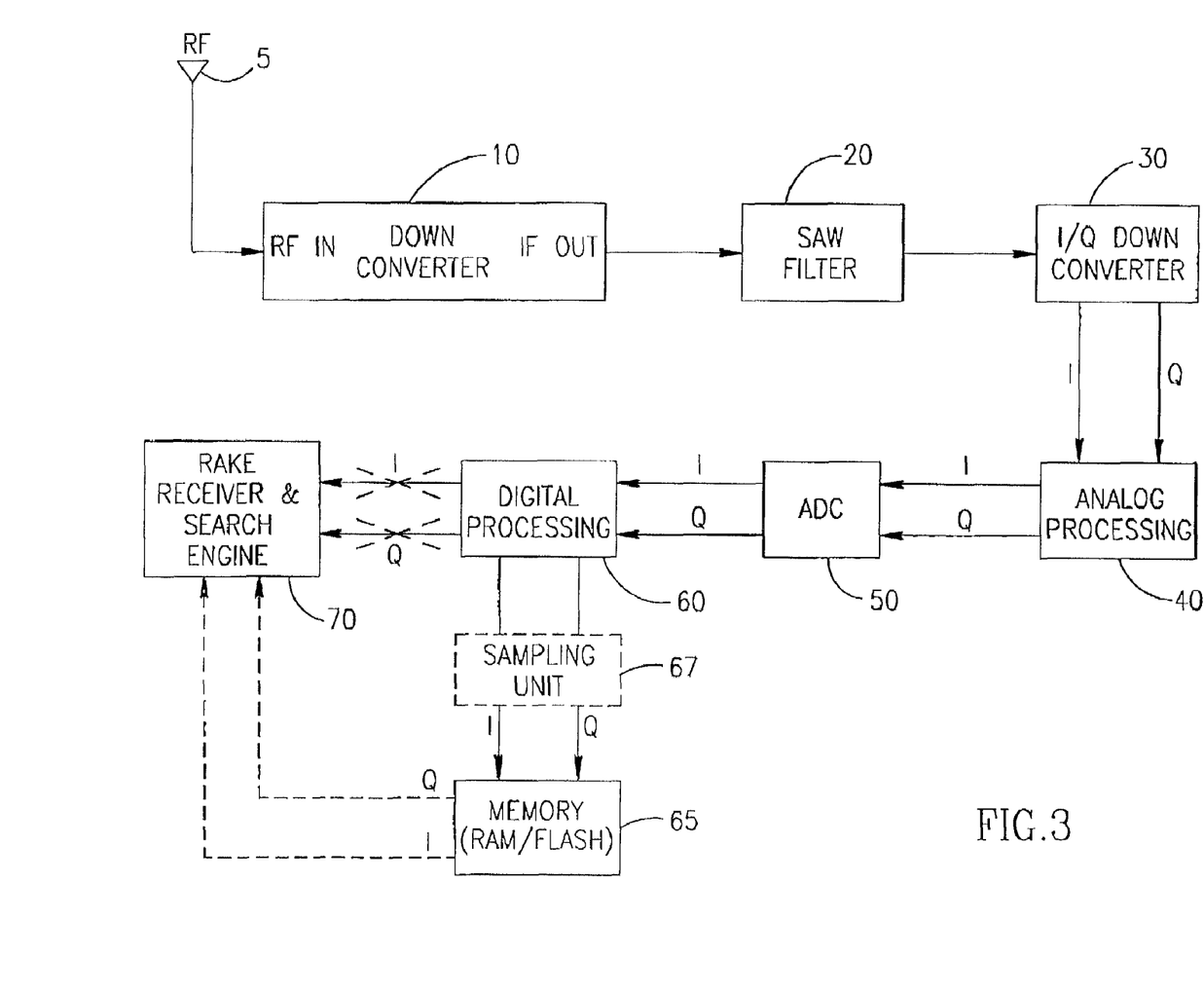
FIG. 3 is a schematic illustration of a CDMA receive path, with an indication of a point for recording a portion of the CDMA signal, according to another embodiment of the present invention.

Reference is now made to FIG. 3, which illustrates another embodiment of the present invention, wherein the portion of the signal may be recorded between the output of digital processing unit 60 and the input to rake receiver and search engine 70. The portion of the signal may be recorded in a memory device, called memory 65, such as, but not limited to, a read-access memory (RAM) or flash memory. In this embodiment, the power consumption may be improved by turning off rake receiver and search engine 70 while recording the portion of the signal. If searching is accomplished with a lower sampling rate than the sampling rate provided by digital processing unit 60, then the ADC clock frequency may be reduced, thus reducing power consumption. Alternatively, a sampling but 67 may be implemented between digital processing unit 60 and memory 65, adapted to truncate the sampling rate to the required rate. Using at least one of the alternatives (clock frequency reduction or sampling unit 57) may enable a reduction in the size of memory 55.

The invention enables processing a recorded portion of the CDMA signal as opposed to processing a real-time signal, advantages of which are explained hereinbelow. For example, in the embodiment illustrated in FIG. 2, the recording point is between the ADC 50 output and the digital processing 60 input. The input to digital processing unit 60 for processing is from memory 55, in which the portion of the signal has been stored. In order to save on power consumption, ADC 50 may be disconnected from digital processing unit 60 when processing the recorded portion of the signal, as shown in dashed lines in FIG. 2.

Alternatively, in the embodiment illustrated in FIG. 3, the recording point is between the digital processing 60 output and the rake receiver 70 input. The input to rake receiver and search engine 70 for processing is from memory 65, in which the portion of the signal has been stored. In order to save on power consumption, the rake receiver and search engine 70 may be de-activated and disconnected from digital processing unit 60 when processing the recorded portion of the signal, as shown in dashed lines in FIG. 3.

There are a number of advantages to processing a recorded portion of the CDMA signal as opposed to processing a real-time signal. First, there is power saving since some of the RF components may be turned off while the processor is working. Second, offline processing (also called background processing) of a recorded portion of the signal may be faster than processing a real-time signal. Offline processing may be accomplished at a processing rate of 100 MHz, for example. Since the source of the rake receiver add search engine 70 is not real-time data, a faster clock rate may be used to drive the rake receiver and search engine 70 and the same processing may be accomplished in a shorter period of time. Third, searching may be done rapidly in the background while continuing to receive the currently received communications carrier.

Figure 4:
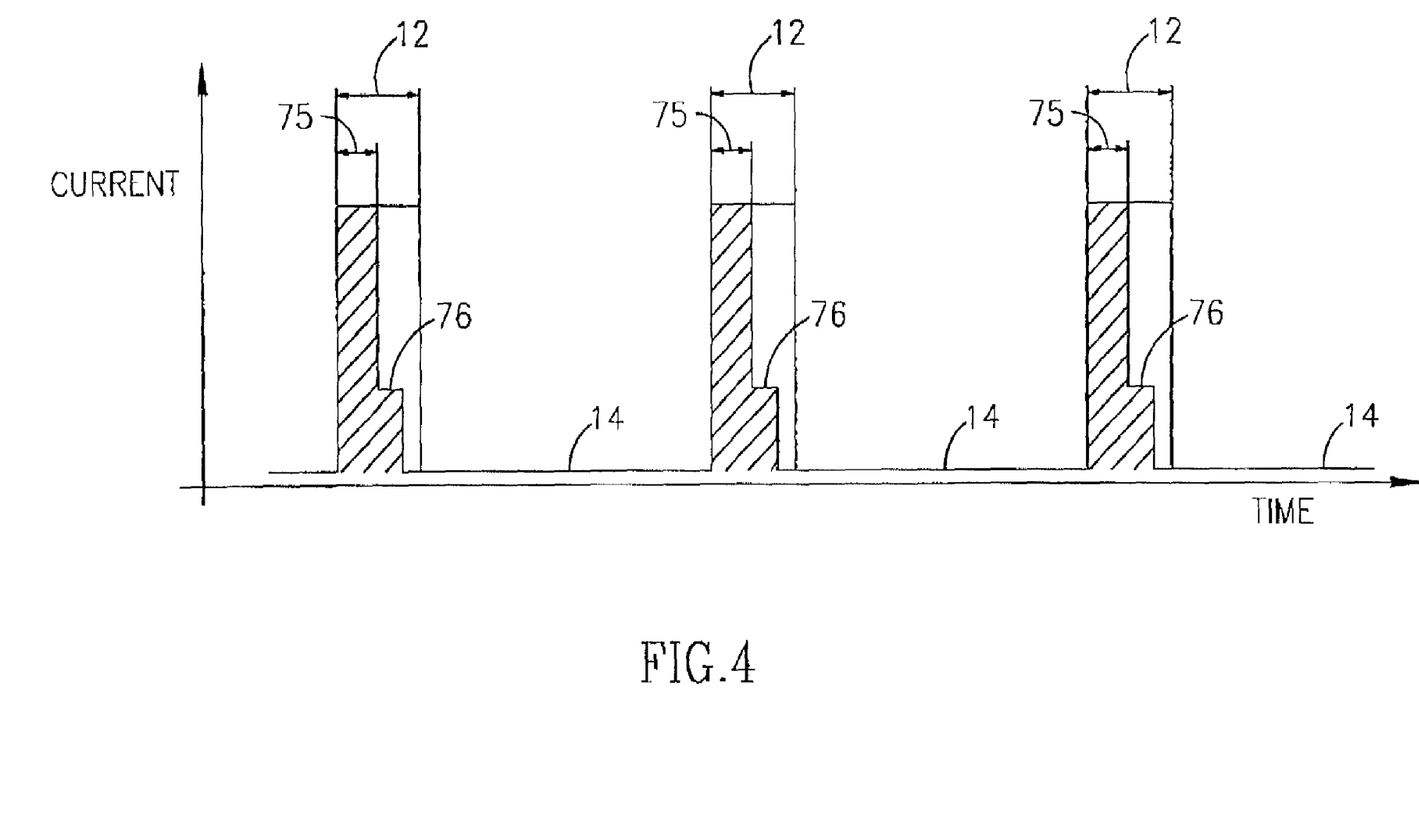
FIG. 4 is a graphical illustration of an example of reduction in power consumption in slotted mode in accordance with an embodiment of the present invention.
Figure 5:
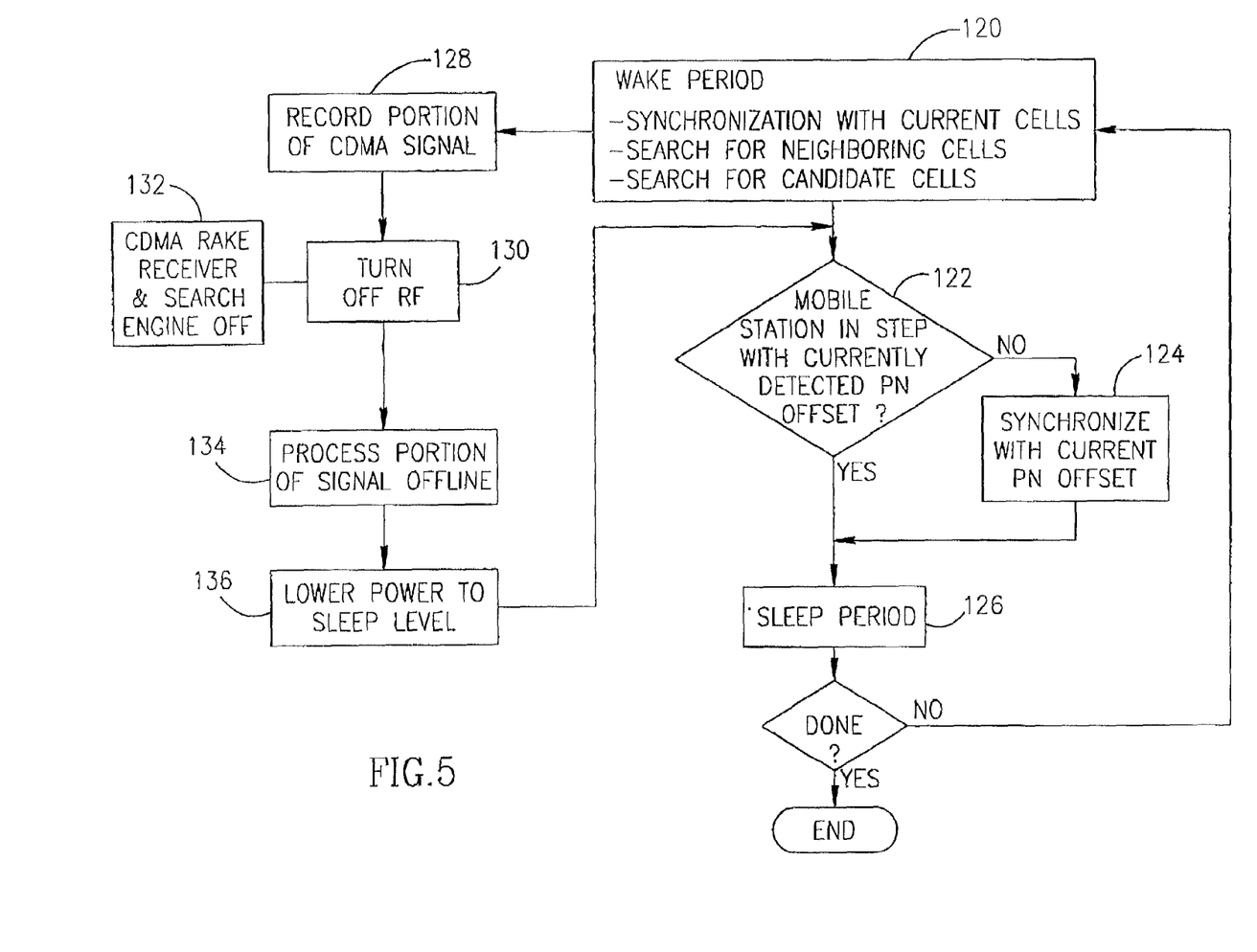
FIG. 5 is a flow chat of reduction in power consumption in slotted mode, in accordance with an embodiment of the present invention.

Reference is now made to FIGS. 4 and 5, which illustrate in graphical and flow chart form respectively, an example of reduction in power consumption in slotted mode, in accordance with an embodiment of the present invention. In slotted mode, there is a relatively short period of reception, called the wake period (step 120 in FIG. 5). During the wake period, three processes are generally performed: 1) synchronization of the down-link channel with that of the current cell, 2) search for neighboring cells, and 3) search for candidate cells, that is, cells that have a good probability of soon becoming the current cell. "Synchronization" means that if the mobile station has been shifted from the currently detected PN offset (step 122 in FIG. 5), then the mobile station is "synchronized" or shifted to the correct PN offset (step 124 in FIG. 5). Depending upon the communications system, other processes may be performed during the wake period as well.

The total duration of time needed to perform the processes of reception (namely in the above example, synchronization and searches for neighboring and candidate cells), is designated by reference numeral 12 in FIG. 4. The duration of time 12 may be considered as the wake up period in the prior art. Each wake-up period is followed by a sleep period, designated by reference numeral 14 in FIG. 4 (step 126 in FIG. 5).

In one embodiment of the present invention, a portion 75 of the signal is recorded during a first time period (step 128 in FIG. 5). The duration of the first time period for recording the portion 75 is significantly less than the duration of time 12 needed to perform the three processes of reception. The duration of recording the portion 75 may be generally about the time needed to perform synchronization. After recording the portion 75, the RF is turned off, as indicated at reference numeral 76 in FIG. 4 (step 130 in FIG. 5). While recording the portion 75, the rake receiver and search engine 70 (FIGS. 1 and 2) along with the RF and analog receiver may be turned on. During the period in which the searching process looks for neighboring stations, the rake receiver and search engine 70 way be turned off, since there is no data to receive and process (step 132 in FIG. 5).

The portion 75 of the CDMA signal is then processed off line during a second time period (step 134 in FIG. 5). It is noted that the second time period may be separate from or at least partially overlap the first time period. The procedure continues with checking if the mobile station is in step with the currently detected PN offset (step 122 hereinabove). Power remains on for analog and digital processing, but since the processing is done at a fast rate, even that power is lowered to the sleep level before the total time normally needed to perform the three processes of reception (step 136 in FIG. 5). The shortened wake period is shown in the shaded areas of FIG. 4. Thus the present invention reduces power consumption, reduces the wake period and increases the sleep period 14 in slotted mode.

It will be appreciated by persons skilled in the art that the present invention is not limited by what has been particularly shown and described herein above. Rather the scope of the invention is defined by the claims that follow:

What is claimed is:

1. A method comprising:
   receiving through an antenna of a radio frequency module a pilot signal at a first clock rate during at least part of a first time period of a wake period of a slotted mode;
   deactivating said radio frequency module after receiving said pilot signal;
   determining a pseudo-random noise offset of said pilot signal at a second, faster clock rate during at least part of a second time period of said wake period; and
   synchronizing said radio frequency module to said determined pseudo-random noise offset if said module is out of step with currently said determined pseudo-random noise offset.

2. The method according to claim 1 wherein said pilot signal is a spread spectrum signal.

3. The method according to claim 1 wherein said pilot signal is a Code Division Multiple Access (CDMA) signal.

4. The method according to claim 1, further comprising at least one of searching for at least one neighboring communications cell and searching for at least one candidate communications cell.

5. The method according to claim 1 comprising receiving a carrier during at least part of said second time period.

6. The method according to claim 1 comprising reducing power consumed during said at least one wake period after recording said received signals.

7. A receiver comprising:
   an antenna;
   a radio frequency module coupled to said antenna for receiving a pilot signal at a first clock rate during at least part of a first time period of a wake period of a slotted mode; and
   a processor for deactivating said radio frequency module after said pilot signal is received and for determining a pseudo-random noise offset of said pilot signal at a second, faster clock rate during at least part of a second time period of said wake period and for synchronizing said radio frequency module to said determined pseudo-random offset if said module is out of step with currently said determined offset.

8. The receiver according to claim 7 wherein said radio frequency module comprises a memory device for storing at least a portion of said pilot signal, and wherein said processor comprises a digital processing unit, wherein said memory device is adapted to output said portion of said pilot signal to said digital processing unit.

9. The receiver according to claim 8 comprising a sampling unit adapted to receive said portion of said pilot signal and to output said portion of said pilot signal to said memory device.

10. The receiver according to claim 7 wherein said radio frequency module comprises a memory device for storing at least a portion of said pilot signal, and wherein said processor comprises a rake receiver and a search engine, wherein said memory device is adapted to output said portion of said pilot signal to said rake receiver and said search engine.

11. The receiver according to claim 10 comprising a sampling unit adapted to receive said portion of said pilot signal and to output said portion of said pilot signal to said memory device.

12. A cellular communication system comprising:
an antenna;
a radio frequency module coupled to said antenna for receiving a pilot signal at a first clock rate during at least part of a first time period of a wake period of a slotted mode; and
a processor for deactivating said radio frequency module after said pilot signal is received and for determining a pseudo-random noise offset of said pilot signal at a second, faster clock rate during at least part of a second time period of said wake period and for synchronizing said radio frequency module to said determined pseudo-random noise offset if said module is out of step with currently said determined pseudo-random noise offset.

13. The cellular communication system according to claim 12 wherein said radio frequency module comprises a memory device for storing at least a portion of said pilot signal, and said processor comprises a digital processing unit, wherein said memory device is adapted to output said portion of said pilot signal to said digital processing unit.

14. The cellular communication system according to claim 13 comprising a sampling unit adapted to receive said portion of said pilot signal and to output said portion of said pilot signal to said memory device.

15. The cellular communication system according to claim 12 wherein said radio frequency module comprises a memory device for storing at least a portion of said pilot signal, and said processor comprises a rake receiver and a search engine, wherein said memory device is adapted to output said portion of said pilot signal to said rake receiver and said search engine.

16. The cellular communication system according to claim 15 comprising a sampling unit adapted to receive said portion of said pilot signal and to output said portion of said pilot signal to said memory device.

* * * * *